United States Patent [19]

Blumhardt

[11] 3,731,468
[45] May 8, 1973

[54] SWATH TREATING APPARATUS
[76] Inventor: Harold Blumhardt, Fredonia, N. Dak. 58440
[22] Filed: Sept. 1, 1971
[21] Appl. No.: 176,847

[52] U.S. Cl. .......................................... 56/1, 56/192
[51] Int. Cl. .................................................. A01d 43/00
[58] Field of Search ........................... 56/192, 1, 249; 171/3, 58; 172/538

[56] References Cited
UNITED STATES PATENTS
3,136,108  6/1964  Wood ................................ 171/58 X FOREIGN PATENTS OR APPLICATIONS
261,497  6/1913  Germany .............................. 56/192

Primary Examiner—Louis G. Mancene
Assistant Examiner—J. N. Eskovitz
Attorney—Merchant & Gould

[57] ABSTRACT

A crop swath roller including a pair of axially aligned frusto-conical sections having adjacent axially inner ends of relatively small diameter and axially outer ends of relatively large diameter. The roller is supported from a mobile frame for rolling movement longitudinally over a swath or windrow of cut crop.

2 Claims, 5 Drawing Figures

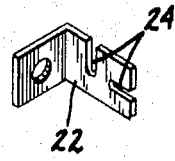
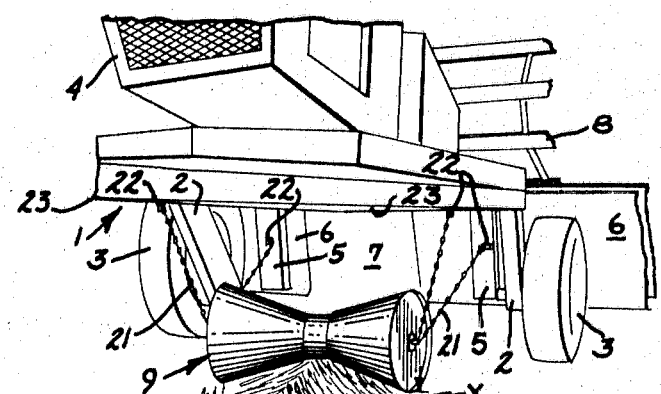
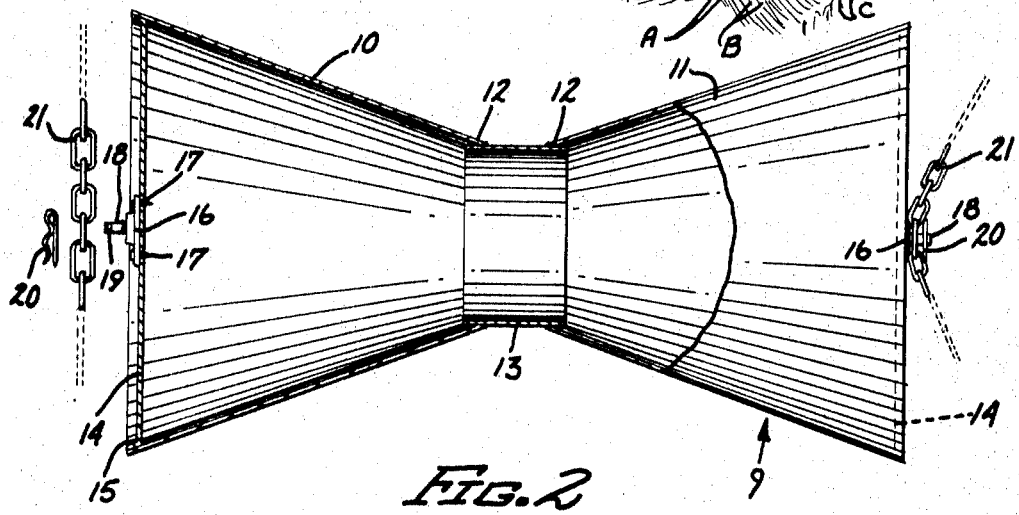
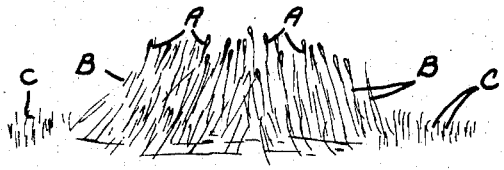
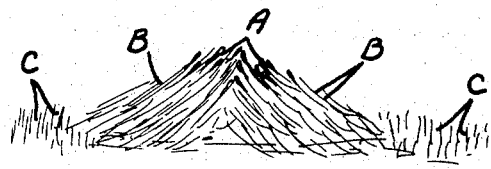

SWATH TREATING APPARATUS

BACKGROUND OF THE INVENTION

When cultivated crops, such as flax or other grain crops, are ready for harvest, many thereof are windrowed for field curing. Many swathers, used for harvesting and windrowing such crops, have center crop delivery systems which promote the disposing of the heads or beards of grain toward the central portion of a windrow. However, even with such windrow formations, crops subject to high winds can be blown away or scattered, and moisture from rains works downwardly into the crops and underlying ground. Thus, curing is often delayed and uneven.

SUMMARY OF THE INVENTION

An important object of this invention is the provision of means for treating a swath or windrow to move the grain heads of the crop closer to the center of the windrow, and to shape the windrow for efficient moisture drainage and extreme resistance to winds.

To these ends, I provide a roller of generally hourglass shape including a pair of axially aligned frusto-conical portions having their adjacent axially inner ends of relatively small diameter and their axially outer ends of relatively large diameter. The outer ends include outer end walls having axial bearings journalling aligned stub shafts which project axially outwardly therefrom. The roller is supported from a mobile frame on a generally horizontal axis extending transversely of the direction of travel of the frame by a pair of elongated flexible tie members. Each tie member is secured intermediate its ends to a different one of the stub shafts and at points between said stub shafts and the outer ends of the tie members to mounting brackets that are adapted to be secured to the mobile frame. The tie members are adjustable relative to their respective mounting brackets to support the roller at various selected elevations above the ground. Rolling movement of the roller longitudinally over a swath or windrow tends to move the heads of the crop stems toward the center of the windrow and presses the outer ends of the stems downwardly into the stubble so that the stems slope laterally outwardly and downwardly, thus promoting effective run off of water during rains, and minimizing the effect of high winds on the windrow.

DESCRIPTION OF THE DRAWINGS

FIG. 1 is a fragmentary view in perspective of a conventional swather with the swath treating roller of this invention mounted thereon;

FIG. 2 is an enlarged view in side elevation of the swath treating apparatus of FIG. 1, some parts being broken sway and some parts being shown in section;

FIG. 3 is a view in perspective of a mounting bracket;

FIG. 4 is a view in transverse section of a windrow of grain prior to treatment thereof by the roller of this invention; and FIG. 5 is a view corresponding to FIG. 4 but showing the swath after the swath treating roller has been run thereover.

DETAILED DESCRIPTION OF THE PREFERRED EMBODIMENT

In FIG. 1, a swather is fragmentarily shown as comprising a frame 1 having a pair of laterally spaced downwardly and forwardly sloping legs 2 which journal a pair of axially aligned tire-equipped wheels 3 that are driven from an engine, not shown, but contained within an engine housing 4. The frame 1 further includes a pair of laterally spaced depending frame members 5 which support a pair of endless belt conveyors or drapers 6 which operate to convey cut crop laterally inwardly with respect to the swather and deposit the crop on the ground through an opening 7 defined by the adjacent inner ends of the conveyors or drapers 6. The swather further includes the usual crop feeding reel 8, and may be of any of the several makes of manufacture of the type generally disclosed in U.S. Pat. Nos. 2,677,225 and 3,151,429. Swathers of this type usually deposit the cut crop, such as grain, on the ground in a windrow such as shown in FIG. 4, with the heads A of the cut crop disposed toward the central portion of the windrow and the stems B more or less outwardly toward the opposite edges of the windrow, as shown in FIG. 4, the uncut stubble left in the field being indicated at C. As thus deposited in a windrow, the grain rests more or less loosely on top of the stubble C, and may be fairly easily scattered during a brisk or high wind. Further, should rain occur before the windrow is gathered for further crop treatment, the rain drops penetrate easily through the windrow, moistening the ground therebeneath, and delaying the drying or curing operation. The swather above described does not, in and of itself, comprise the instant invention. Hence, further detailed showing and description thereof being believed unnecessary, is omitted, in the interest of brevity.

The roller of this invention is indicated generally at 9, and comprises a pair of frusto-conical sections 10 and 11 disposed in axial alignment with their smaller diameter inner ends 12 being disposed adjacent one another and welded or otherwise rigidly secured to opposite ends of a short cylindrical central member 13. At their relatively large outer diameters, the roller sections 10 and 11 are provided with float-like end walls 14 having circumferential flanges 15 by means of which the end walls 14 are welded or otherwise rigidly secured to their respective frusto-conical sections 10 and 11.

A pair of conventional bearings 16 are rigidly secured each to a different one of the end walls 14, by means of screws 17, the bearings 16 being preferably of the rolling friction variety and disposed in axial alignment. Each of the bearings 16 journals an axially upwardly projecting stub shaft 18 having a transverse opening 19 adjacent its outer end, for reception of a conventional retainer clip 20.

The roller 9 is mounted on the mobile swather frame 1 by a pair of elongated flexible members in the nature of link chains 21. As shown, the chains 21 are each mounted intermediate its ends on a different one of the stub shafts 18 and held in place thereon by a respective one of the clips 20. A pair of L-shaped mounting brackets 22 are rigidly mounted on the frame members 5, another pair of the brackets being mounted on laterally spaced horizontal frame members 23 of the swather frame 1, in rearwardly spaced relation to the brackets 22 on the frame members 5. Each of the brackets 22 is provided with a pair of angularly displaced notches 24 for reception selectively of the links of the chains 21 to support the roller 9 on a generally horizontal axis extending generally transversely of the direction of travel of the swather frame 1 and transversely of the windrow thereunder. The notches 24 are each of a width to receive a link of the adjacent one of the chains 21 edgewise, and will not permit an adjacent link to pass therethrough. Thus, by placing appropriate links of the chains 21 in given notches 24 of the brackets 22, the roller 9 can be suspended from the swather frame 1 at any desired elevation above ground level, as indicated by the dimension X in FIG. 1.

As the roller 9 rolls longitudinally over a windrow, the grain is pressed downwardly thereby so that the heads A are moved closer to the center of the windrow, the stems B being pressed downwardly into the stubble C adjacent the lateral edges of the windrow, as shown in FIG. 5. The heads A of the grain are moved closely together, as are the stems B, so that, in rainy weather, moisture flows laterally outwardly to the opposite edges of the windrow. Hence, very little moisture soaks through the windrow to the stubble underneath the central portion thereof, lessening the drying time. Further, with the windrow thus compressed at the outer edges and firmed into the stubble throughout its width, the crop is not disturbed by relatively high winds, and the windrows remain stable until final gathering of the crop.

While I have shown and described a commercial embodiment of my swath treating apparatus, it will be understood that the same is capable of modification without departure from the spirit and scope of the invention, as defined in the claims.

What is claimed is:

1. Swath treating apparatus comprising, a roller including a cylindrical longitudinally central section and a pair of frusto-conical sections having smaller diameter inner ends connected to opposite end portions of said central section and larger diameter larger ends, axial shaft means at said outer ends, a pair of elongated flexible tie members each connected to a different one of said shafts, and anchoring members for connection to a mobile frame, said tie members being connected to said anchoring members to support said rollers for rolling movements over a windrow of cut crop and for limited free generally upward and downward movement of each end of said roller independently of the other end thereof.

2. The swath treating apparatus defined in claim 1 in which said tie members are adjustable relative to said anchoring members to support said roller at selected elevations above ground level.

* * * * *